(No Model.)
J. McLAUGHLIN.
EMERY WHEEL.
No. 278,578. Patented May 29, 1883.
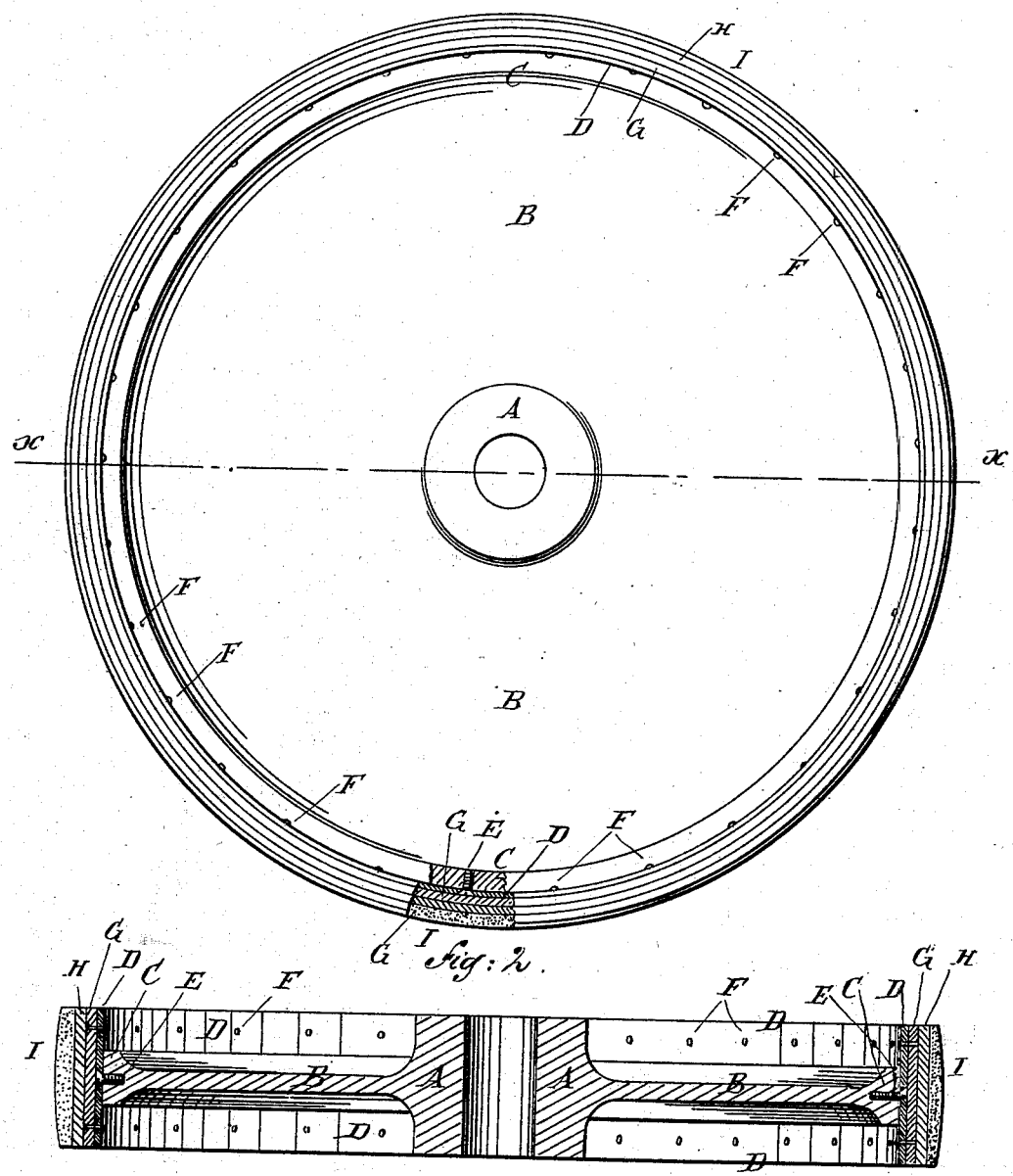

United States Patent Office.

JOHN McLAUGHLIN, OF BROOKLYN, NEW YORK.

EMERY-WHEEL.

SPECIFICATION forming part of Letters Patent No. 278,578, dated May 29, 1883.

Application filed March 12, 1883. (No model.)

*To all whom it may concern:*

Be it known that I, JOHN MCLAUGHLIN, of Brooklyn, in the county of Kings and State of New York, have invented a new and useful Improvement in Emery-Wheels, of which the following is a full, clear, and exact description.

Reference is to be had to the accompanying drawings, forming a part of this specification, in which similar letters of reference indicate corresponding parts in both the figures.

Figure 1 is a side elevation of my improvement, part being broken away. Fig. 2 is a sectional plan view of the same, taken through the line $x$ $x$, Fig. 1.

The object of this invention is to increase the strength of emery-wheels, and thereby promote security in using such wheels.

The invention has for its further object to keep the emery-wheels true.

The invention consists in an emery-wheel constructed with a cast-iron wheel, and a wrought-iron tire shrunk upon the said wheel. To the wrought-iron tire is secured by rivets a leather band to form a seat for the leather band that carries the emery compound, as will be hereinafter described.

A represents the hub of the wheel, which is cast with a circular web, B. The outer edge or rim, C, of the web B is thickened to form a substantial seat for the tire D. The tire D is made of wrought-iron, and is shrunk upon the rim of the cast wheel A B C, so as to be firmly secured to the said wheel. The tire D is further secured in place upon the wheel A B C by screws E, passing through the said tire and screwing into the rim of the said wheel. To the tire D is secured, by copper rivets F, or other suitable means, a leather band, G. To the leather band G is cemented or otherwise secured a second leather band, H, to which the emery compound I is applied in the ordinary manner. With this construction the wheel has no projecting parts to catch the air, so that it will run smoothly, and at the same time the wrought-iron tire D binds the wheel A B C firmly together, so that it will not be liable to fly into pieces.

Having thus fully described my invention, I claim as new and desire to secure by Letters Patent—

1. An emery-wheel constructed substantially as herein shown and described, and consisting of the cast wheel A B C, the wrought-iron tire D, the leather bands G H, and the emery compound I, as set forth.

2. In an emery-wheel, the combination, with the wrought-iron tire D, of the leather band G and the rivets F, substantially as herein shown and described, to form a seat for the emery-carrying band, as set forth.

JOHN McLAUGHLIN.

Witnesses:
 EDW. M. CLARK,
 C. SEDGWICK.